(No Model.)
B. J. McGRANN.
VEHICLE SEAT.
No. 558,595. Patented Apr. 21, 1896.
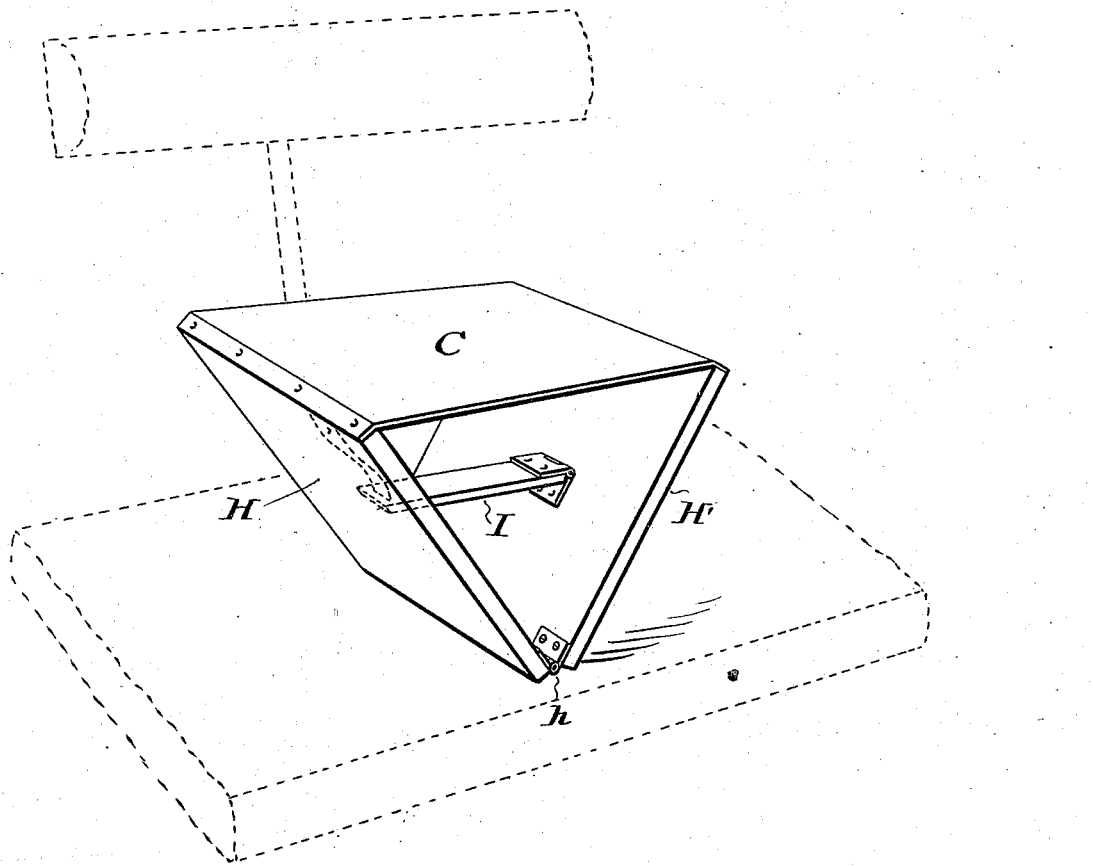
WITNESSES:
F. Norman Dixon
Thos. K. Lancaster
INVENTOR
B. J. McGrann
by his attorneys
Strawbridge & Taylor

UNITED STATES PATENT OFFICE.

BERNARD J. McGRANN, OF LANCASTER, PENNSYLVANIA.

VEHICLE-SEAT.

SPECIFICATION forming part of Letters Patent No. 558,595, dated April 21, 1896.

Application filed October 28, 1895. Serial No. 567,083. (No model.)

*To all whom it may concern:*

Be it known that I, BERNARD J. MCGRANN, a citizen of the United States, residing in the city and county of Lancaster, in the State of Pennsylvania, have invented certain new and useful Improvements in Vehicle-Seats, of which the following is a specification.

The seats of vehicles, such as buggies, as commonly constructed are made of such lengths as to adapt them for the occupancy of two persons only, and therefore when such seats are occupied by three persons it has been necessary for the third person to be seated upon the knees of the other two. While the space between two persons occupying the seat is not sufficient to accommodate a third person, it is yet sufficient for the existence of the base or support of a supplemental seat for such third person, adapted to be mounted in connection with said main seat or vehicle-body, the top or seat proper of which occupies a position sufficiently above the level of the main seat to clear the limbs of the two persons occupying the main seat.

It is the object of my invention to provide a supplemental seat to be used in connection with the permanent seat or body of a vehicle, which shall occupy the minimum space, shall be of great simplicity and cheapness of construction, and by reason of its capacity to sway or rock with the person occupying it in harmony with the vibrations of the vehicle shall diminish the liability of the unseating of the occupant.

In the accompanying drawing I show and herein I describe a good form of a convenient embodiment of my invention, the particular subject-matter claimed as novel being hereinafter definitely specified.

The accompanying drawing represents in perspective the preferred embodiment of my invention.

My invention comprehends the provision of a supplemental seat adapted to rest upon the upper surface of an ordinary vehicle-seat, and, when occupied, to be supported in upright position by the contact of the feet or limbs of the occupant with the body of the vehicle or the permanent seat of the vehicle.

My improved supplemental seat is, as shown in the accompanying drawing, constructed of two counterpart rigid plates (designated, respectively, H H') united at their lower edges by a hinge *h* and united at their upper edges by the top C. The top C is, in the preferred form of my invention, shown in the drawing, illustrated as consisting of a piece of carpet, canvas, or similar flexible material, permanently attached as to its respective ends to the respective upper ends of the plates H H'.

As will be understood, my improved seat shown in the figure is adapted to occupy but a small space when not in use inasmuch as the flexible top C will naturally depend between the plates H H', which plates may be closed together into very small compass, being, when in closed position, only separated by the thickness of the canvas or other top C. When said seat is not in use, therefore, it can be folded together and deposited in the bottom of the vehicle, where, by reason of its small compass, it will occupy but little space.

If desired, a brace I may be employed in connection with my improved seat, as shown in the figure, for the purpose of maintaining said seat in open position when in use. Said brace may be, as shown in said figure, hingedly secured to the inner face of one plate and engaged by a suitable catch in the opposing face of the other plate. As will be understood, however, this brace may be readily dispensed with and is not essential to my device for the reason that, when said seat is occupied, the body of the occupant resting upon the canvas top C will come between the top edges of the plates H H' and prevent them from closing together.

All the members of my improved vehicle-seat are permanently united together, so that there are no parts to become detached or lost.

I am aware that it has been proposed to form a supplemental vehicle-seat by providing a double pair of outwardly-flaring curved standards, pivotally mounted at their lower ends upon a rod, the tops of the standards being connected in pairs by suitable tie bars or rods and the whole being encompassed by a fillet of canvas or other material; but to such construction, involving as it does the use of a large quantity of canvas and attended in practice by the disadvantage of incapacity for being folded flat owing to the curvature of the standards and the further disadvantage of lack of compactness when folded owing to the large festoons of the encompassing canvas necessarily formed, I lay no claim.

Having thus described my invention, I claim—

A supplemental seat for a vehicle, consisting of a pair of counterpart flat plates hingedly connected as to their lower edges and connected as to their upper edges by a top or seat proper consisting of canvas or other flexible material permanently secured to the upper ends of the respective plates, substantially as set forth.

In testimony that I claim the foregoing as my invention I have hereunto signed my name this 21st day of October, A. D. 1895.

BERNARD J. McGRANN.

In presence of—
WM. C. STRAWBRIDGE,
F. NORMAN DIXON.